Feb. 5, 1963
R. H. HUDDLESTON, JR
MEANS AND TECHNIQUES FOR EFFECTING
A MATHEMATICAL INVERSION
Filed March 31, 1959
3,076,955
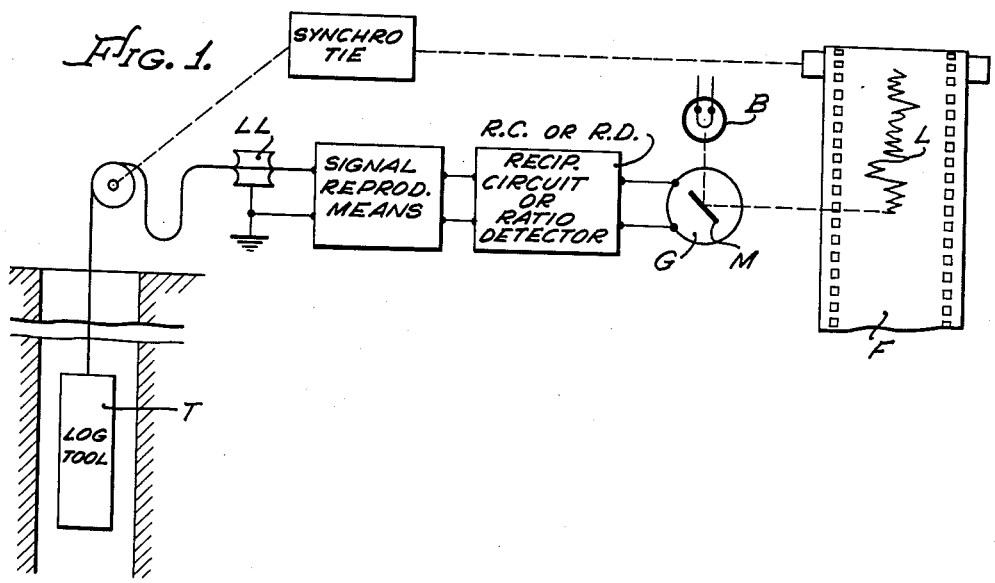
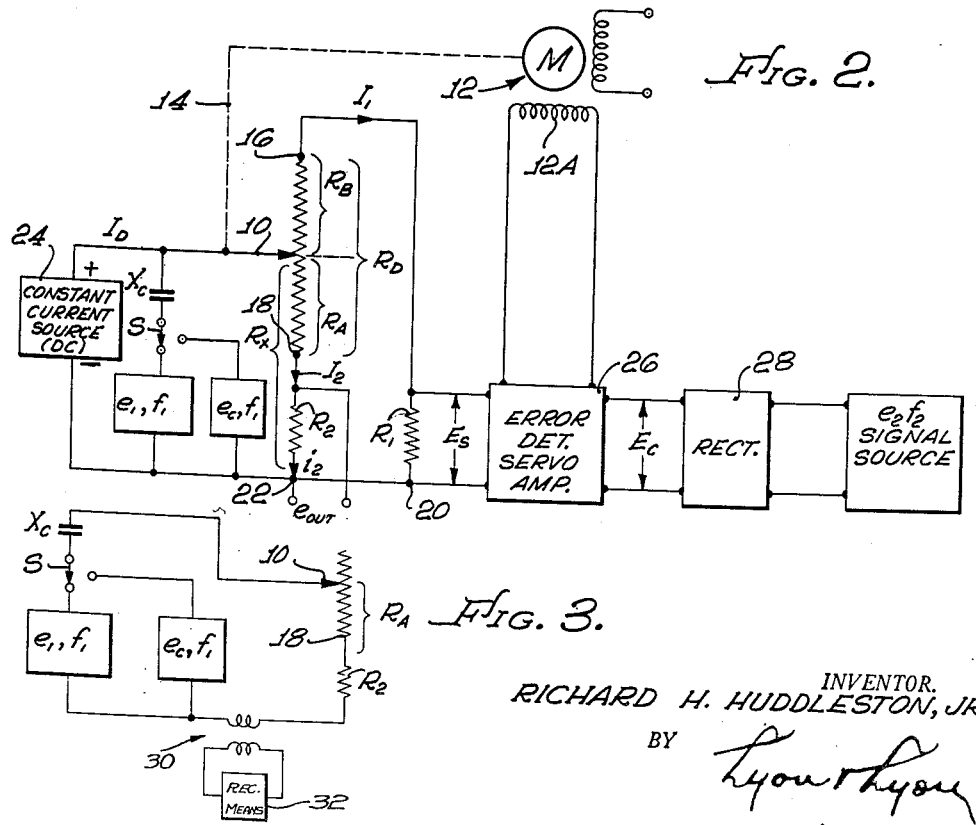
INVENTOR.
RICHARD H. HUDDLESTON, JR.
BY
ATTORNEYS.

United States Patent Office 3,076,955
Patented Feb. 5, 1963

3,076,955
MEANS AND TECHNIQUES FOR EFFECTING A MATHEMATICAL INVERSION
Richard H. Huddleston, Jr., Houston, Tex., assignor to Halliburton Company, a corporation of Delaware
Filed Mar. 31, 1959, Ser. No. 803,289
6 Claims. (Cl. 340—18)

The present invention relates to improved means and techniques for deriving from a first varying electrical quantity, a second electrical quantity which is an indication of the mathematical reciprocal of the first quantity or for indicating the ratio of two varying electrical quantities. The present invention is particularly useful in bore hole logging equipment wherein it is desired to record logging information, otherwise recordable in the form of a conductivity log, in the form of a resistivity log or vice versa, or in other cases to indicate the ratio of two varying quantities, one of which is representative of formation current and the other one of which is representative of formation voltage to thereby derive an indication of either conductivity or of formation resistivity.

In some forms of well logging operations as, for example, in induction well logging where the effect of magnetically induced eddy currents in earth formations on a receiver coil are measured or indicated, the indications or measurements made vary in substantially direct proportion to the current flowing in the earth formations under investigation. This means that a plot of such indications or measurements with respect to the position of the logging tool in the bore hole results in a conductivity-type log, as distinct from a resistivity-type log, since conductivity, in accordance with Ohm's law, is equal to $$\frac{I}{E}$$

where I is the formation current and E is the voltage causing such current flow in the formations. In other words, the term I is in the numerator of the above expression, and thus as I increases, the indicated or measured conductivity increases also in the same proportion. Usually in systems of this type of logging, the quantity E is assumed to be constant since usually a transmitter coil which causes the eddy currents is supplied with a constant current.

It is oftentimes desirable for many different reasons, for example, for comparison with other logs and for perhaps enhanced accuracy where formation conductivity is low, to convert these indications or measurements in such form as to obtain a resistivity log. This, in effect, involves a provision of means receptive to the incoming I signal and functioning to derive a second quantity which is in proportion to the inverse or mathematical reciprocal of I, i.e.

$$\frac{I}{K} \text{ or } \frac{K}{I}$$

where K is a constant, and then applying such second derived quantity to a recording galvanometer in which the movable element is deflected in accordance with the reciprocal of I, in which case a resistivity log is obtained. It is understood, of course, that resistivity is the inverse or mathematical reciprocal of conductivity.

In other types of logging systems as, for example, in various forms of electrical logging systems, the current flowing through the formations may be maintained constant and a resulting voltage drop is indicated. In such case, a recording of the voltage drop results in a resistivity-type log since, as the resistivity increases, the indicated or measured voltage drop increases also. Instead of recording indications of such voltage drop directly for purposes of obtaining a resistivity-type log, it is oftentimes desirable to record a conductivity-type log; and, in such case, the same form of means alluded to above is first used to obtain an inversion or reciprocation of the logging signal prior to recording. Further, in other forms of logging systems the conductivity or resistivity is computed in terms of the ratio of two varying electrical quantities, one of which is representative of formation current and the other one of which is representative of formation voltage; and the present invention is adaptable also for determinations of such ratio.

It is therefore an object of the present invention to provide improved means and techniques of the character indicated above whereby either conductivity or resistivity-type logs may be produced from information which otherwise, when recorded, would be in the form of a different type log; and also whereby the ratio of two varying electrical quantities may be computed by a simple conversion of such means.

Another object of the present invention is to provide an improved inverting or reciprocating circuit or ratio detector for these purposes, characterized in that the same has a large dynamic range, i.e. has the capability of producing accurate results over a large range of input signals corresponding either to I or E or to both a varying E and I as the case may be.

Another object of the present invention is to provide improved means and techniques for these purposes using only one slidewire-type resistance instead of two slidewire-type resistances as described in my co-pending application Serial No. 799,983 filed March 17, 1959, and assigned to the present assignee.

Another object of the present invention is to provide improved means and techniques of this character in which a single slidewire-type resistance is used to thereby eliminate tracking problems otherwise present when two slidewire-type resistances are used.

Another object of the present invention is to provide an improved system of this character which may be made relatively small and compact and one in which a servo motor is required to derive only one movable tap or wiper arm, thereby also reducing the load requirements on the servo motor whereby the same may be made smaller.

Another object of the present invention is to provide an improved system of this type in which a single slidewire resistance operates in an Ayrton shunt circuit whereby resistance tolerance is of practically no importance in achieving accurate results.

Another object of the present invention is to provide an improved system of this character in which the linearity of the slidewire resistance does not affect accuracy of the results, the term linearity having reference to the fact that the potentiometer-type resistance in this case need not produce the same incremental change in resistance when the wiper arm is moved the same incremental distances along the resistance strip.

Another object of the present invention is to provide improved system of this type which allows the use of a high-value potentiometer resistance for achieving better resolution.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates generally many forms of bore hole logging systems embodying features of the present invention.

FIGURE 2 illustrates details of the reciprocating circuit or ratio detector indicated as such in FIGURE 1 and embodying features of the present invention.

FIGURE 3 illustrates a modification of the present invention in which the output signal is derived from a current transformer, the output signal in this case being either a reciprocated signal or the ratio of two varying signals as the case may be.

FIGURE 1 illustrates generally bore hole logging systems in which the present invention is particularly useful. A log L, either of the conductivity or resistivity type, as the case may be, is produced on a photographic film F which is driven in timed relationship with movement of the logging tool T when and as the same is moved in the bore hole past the various earth formations traversed by such bore hole. This relationship between movement of the logging tool T and film F is indicated generally by the synchro Tie in FIGURE 1 which is representative of means whereby the film F is moved synchronously with the logging line LL, i.e. the logging tool T, and, of course, the particular means used for accomplishing this result involve well known and used techniques and hence the same need not be described specifically.

The logging tool T may be any one of the well known types and incorporates means whereby a signal or signals are developed which is an indication or a measurement of the characteristic of the formations adjacent the logging tool. For example, in an induction logging system, the signal may be a voltage developed in a receiver coil in response to eddy currents induced in such formations, and thus be respresentative of formation conductivity; or in the case of an electrical logging system, the signal may be an indication of a voltage drop across the formations and thus be a measure of the formation resistivity. In other systems two varying signals may be produced and their ratio computed for determining resistivity or conductivity. In either case, the signal is transmitted using conventional means over the logging line LL to surface equipment which includes conventional signal reproducing equipment, indicated as such in FIGURE 1, for producing a signal or signals representative of the signal or signals developed in the logging tool T. The signal or signals so reproduced and in representative form are applied to the reciprocating circuit (R.C.) or ratio detector (R.D.), and the output thereof is applied to the recording galvanometer G. The galvanometer mirror M is thus deflected proportionately, in accordance with the amplitude of the output signal developed in the reciprocating circuit or ratio detector and serves to direct a beam of light from lamp bulb B onto film F to produce the log L.

FIGURE 2 shows elements which are included in the block designated R.C. or R.D. in FIGURE 1 and the same are shown conditioned for operation as a ratio detector (R.D.), i.e. the switch S is shown in its R.D. position. This switch S, when in its other position designated R.C., conditions the system for operation as a reciprocating circuit. The circuit shown in FIGURE 2 is first described when operating as a ratio detector.

One input signal is represented as $e_1$ having a frequency $f_1$ and the same is understood to be obtained from the "Signal Reproducing Means" shown in FIGURE 1. This signal $e_1$ is considered to be an amplitude-modulated wave, i.e. a wave having a frequency $f_1$ modulated in accordance with a signal derived from the logging tool.

A second input signal is represented as $e_2$ which may have a different frequency $f_2$ or the same frequency $f_1$, and the same is also considered to be obtained from the "Signal Reproducing Means" shown in FIGURE 1. The signal $e_2$ is considered to be an amplitude-modulated wave, i.e. a wave having a frequency $f_2$ or a frequency $f_1$ modulated in amplitude is accordance with a second signal derived from the logging tool. While FIGURE 2 thus shows input signals of different frequencies $f_1$ and $f_2$ to demonstrate the fact that the two frequencies need not be identical, the system as described will operate when the two input signals have the same frequency. The signals $e_1$ and $e_2$ may be considered to be denominator and numerator signals respectively or vice versa. For the present discussion $e_1$ is considered to be the numerator signal and $e_2$ the denominator signal.

The potentiometer-type resistance $R_D$, the only slide-wire resistance necessary in this system, has its movable tap or wiper arm 10 positioned by the controlled servo motor 12 as indicated by the dotted line 14. This resistance $R_D$, is connected in a series circuit which comprises the resistance $R_D$, the resistance $R_1$ and the resistance $R_2$, it being noted that one outside terminal 16 of resistance $R_D$ is connected to one terminal of resistance $R_1$ and that the other outside terminal 18 of resistance $R_D$ is connected to one terminal of resistance $R_2$ with the other terminals 20 and 22 of resistances $R_1$ and $R_2$ respectively being interconnected. It is noted further that the movable tap 10 divides resistance $R_D$ into two sections, namely a resistance section $R_B$ between terminal 16 and the tap 10 and a second resistance section $R_A$ between tap 10 and terminal 18. The tap 10 is connected to the positive terminal of a constant current D.C. source 24, the other negative terminal of source 24 being connected to terminal 22 so as to produce a current flow through the series-connected resistances $R_A$ and $R_2$ represented by $I_2$.

The tap 10 is also connected through condenser $X_C$ and switch S to one terminal of the signal source $e_1$, the other terminal of source $e_1$ being connected to terminal 22 so as to produce a current flow through the series connected resistances $R_A$ and $R_2$ as indicated by the current $i_2$.

It is also noted that the constant current D.C. source 24 also produces a current flow represented by $I_1$ flowing through the resistances $R_B$ and $R_1$. This current $I_1$ flowing through resistance $R_1$ produces a voltage drop across resistance $R_1$ represented by $E_S$; and this voltage $E_S$ is applied to a conventional error detecting servo amplifier circuit 26 which has also applied thereto, for comparison purposes, a D.C. signal $E_C$. The signal $E_C$ is derived from the signal $e_2$ being so converted by the linear converter or rectifier 28 which has its input circuit connected to receive the signal $e_2$ and which functions to develop in its output circuit the voltage $E_C$.

The error detecting circuit 26 serves in conjunction with the servo motor 12 to maintain the voltages $E_S$ and $E_C$ the same, i.e. of equal value, and the same being accomplished by automatic adjustment of the tap 10 on resistance $R_D$. For this purpose an error signal developed as a result of the comparison of $E_S$ and $E_C$ is applied to the servo motor winding 12A for driving such motor 12 and positioning the tap 10 until these voltages $E_S$ and $E_C$ are substantially equal, at which time the error signal is of zero magnitude and the motor 12 stops running, in which case the tap 10 remains stationary.

It will be demonstrated below that the voltage developed across the resistance $R_2$ as a result of current $i_2$ flowing therethrough develops an output voltage represented as $e_{out}$ which is an indication or measure of the ratio of $$\frac{e_1}{e_2}$$

Thus, bearing in mind that the constant current source 24 delivers a constant $I_D$ which is equal to $I_1$ plus $I_2$ and that the reactance or impedance of condenser $X_C$ is very small in comparison to the resistance $R_X$ and that $R_X$ is equal to the sum of the values of resistances $R_A$ and $R_2$, it can be shown that $$\frac{I_1}{I_D} \text{ is equal to } \frac{R_X}{R_D + R_1 + R_2}$$

and that in the balanced condition where $E_S$ is equal to $E_C$ $$R_X = \frac{E_C}{R_1 I_D}(R_D + R_1 + R_2)$$

or where
$$R_X = K_1 E_C$$

$$K_1 = \frac{R_D + R_1 + R_2}{R_1 I_D}$$

a constant.

Thus, the value of $R_X$ is proportional to the conductivity signal $E_C$ or $e_2$, i.e. the denominator signal.

Considering now the A.C. loop comprising the source $e_1$, $X_C$, $R_A$ and $R_2$ and remembering that $X_C \ll R_X$, i.e. $X_C$ is much smaller in impedance value than $R_X$, then $$i_2 \text{ is equal to } \frac{e_1}{R_X} = \frac{e_1}{K_1 E_C}$$

and the voltage drop across the fixed resistance $R_2$ is equal to $$e_{out} = i_2 R_2$$

or $$e_{out} = \frac{e_1 R_2}{K_1 E_C}$$

or $$e_{out} = K_5 \frac{e_1}{e_2}$$

where $$K_5 = \frac{R_2 e_2}{K_1 E_C}$$

a constant.

Thus, the output signal developed across resistance $R_2$ is an indication or measure of the ratio of the two input signals $e_1$ and $e_2$.

When $e_1$ is a varying signal as shown, the system operates as a ratio detector. In those cases where the system operates as a reciprocating circuit, the signal $e_1$ constitutes an A.C. signal of constant amplitude represented by $e_C$ which is connected in the system by switch S in its other or R.C. position. In this latter instance it is clear that the output signal developed across resistance $R_2$ is then a constant divided by the value or amplitude of the $e_2$ signal.

The output signal, when operating either as a ratio detector or as a reciprocating circuit, may be derived by other means. For example, as shown in FIGURE 3, a current transformer 30 has its primary winding connected in the A.C. loop comprising condenser $X_C$, resistances $R_A$, $R_2$ and either source $e_1$ or $e_C$ depending on the adjusted position of switch S so that the current flowing in the meter or recording means 32 connected in series with the secondary winding of transformer 30 indicates or measures, as the case may be, the mathematical ratio or reciprocal of electrical quantities.

It will be appreciated that one skilled in the art having the foregoing teachings may use circuit components having different values for accomplishing the different functions and results described and without limiting the invention to any particular value of such components, the following are recited as exemplary. The values of resistances $R_D$, $R_1$, $R_2$ may be respectively 100,000, 250 and 100 ohms. $E_C$ may vary from 0 to 0.5 volts D.C. The current $I_D$ may be 2 milliamperes D.C. The voltage $e_C$, operative when the system is effective as a reciprocating circuit, may have a value of 0.5 volts at a constant frequency of 10 kilocycles per second. The output voltage $e_{out}$ may vary from 0.5 millivolts to 0.5 volts as $R_A$ varies from its maximum $D_D$ value to zero.

It is considered that the ratio of the values of $R_D$ and $R_2$, i.e.

$$\frac{R_D}{R_2}$$

determines the maximum ratio obtainable and in the example given above this ratio is 1,000 to 1.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a logging system, a sub-system comprising a potentiometer-type resistance having an adjustable tap thereon, a second resistance and a third resistance connected in series with said potentiometer-type resistance, a source of constant unidirectional current having one of its terminals connected to said tap and the other one of its terminals connected to the junction point of said second and third resistances to develop a voltage across said second resistance, a source of a logging signal, a correction system comparing said signal with said voltage and functioning to adjust said tap and said voltage in accordance with said signal, a source of alternating current having one of its terminals connected to said tap and the other one of its terminals connected to said junction point of said second and third resistances, said alternating current source being connected in a series circuit with a portion of said potentiometer-type resistance and said third resistance, and means producing an indication of the current in the last mentioned series circuit.

2. A system as set forth in claim 1 in which said source of alternating current comprises a second logging signal.

3. In a system of the character described, a sub-system comprising a potentiometer-type resistance having an adjustable tap thereon, a first parallel circuit comprising a first portion of said potentiometer-type resistance, a second parallel circuit comprising a second portion of said resistance, said parallel circuits being in parallel with each other and said tap comprising one terminal of both parallel circuits, a source of constant current connected between said one terminal of said parallel circuits and having the other terminal connected to the other terminal of said parallel circuits, means deriving a voltage representative of the current flowing in said first parallel circuit, a signal source developing a signal, a correction system comparing said signal with said voltage and functioning to adjust said tap and said voltage in accordance with said signal, an alternating current voltage source having one of its terminals connected to said one terminal of said parallel circuits and having the other terminal thereof connected to said other terminal of said parallel circuits, and means for indicating the current flow through said second parallel circuit.

4. A system as set forth in claim 3 in which said first signal source comprises a source of a logging signal, and said alternating current source comprises a second source of a logging signal.

5. In a system of the character described, a first source comprising a constant current direct current source, condenser means, a second source comprising alternating current source connected in a series circuit with said condenser means, said series circuit being in parallel with said first source, a potentiometer-type resistance having an adjustable tap connected to one terminal of said first source, a pair of parallel circuits each having one terminal thereof comprising said tap, the other terminal of said parallel circuits being connected to the other terminal of said first source, means deriving a voltage in one of said parallel circuits representative of the current flowing therethrough due to said first source, a source of signals developing a signal, means comparing said voltage and said signal and adjusting said tap in accordance with the comparison, and means indicating that current which flows through the other parallel circuit due to said second source.

6. In a system of the character described, a sub-system comprising a potentiometer-type resistance having an adjustable tap thereon, a first parallel circuit comprising a first portion of said resistance, a second parallel circuit comprising a second portion of said resistance, said first and second parallel circuits being connected in parallel and having said tap defining one terminal thereof, a first constant current source and a second alternating current source each having one of their terminals connected to said tap and each having the other one of their terminals connected to the other terminal of said parallel circuits, means deriving a voltage in one of said parallel circuits, a source of signals developing a signal, means comparing said voltage and said signal and adjusting said tap in accordance with the comparison between said voltage and said signal, and means indicating the current flow in the other parallel circuit.

References Cited in the file of this patent

UNITED STATES PATENTS

| | | |
|---|---|---|
| 2,454,520 | Moore | Nov. 23, 1948 |
| 2,481,492 | Bjarnason | Sept. 13, 1949 |
| 2,497,883 | Harris | Feb. 21, 1950 |
| 2,617,586 | Gray | Nov. 11, 1952 |
| 2,822,977 | Gray | Feb. 11, 1958 |